US009792774B2

(12) United States Patent
Rucker et al.

(10) Patent No.: US 9,792,774 B2
(45) Date of Patent: Oct. 17, 2017

(54) GAMING MACHINE AND METHODS OF ALLOWING A PLAYER TO PLAY GAMING MACHINES HAVING REPLACEMENT SYMBOLS

(71) Applicant: Konami Gaming, Inc., Las Vegas, NV (US)

(72) Inventors: Keith Rucker, Las Vegas, NV (US); Satoshi Suda, Henderson, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 842 days.

(21) Appl. No.: 13/758,734

(22) Filed: Feb. 4, 2013

(65) Prior Publication Data

US 2014/0221079 A1 Aug. 7, 2014

(51) Int. Cl.
*G06F 17/00* (2006.01)
*G07F 17/34* (2006.01)
*G07F 17/32* (2006.01)

(52) U.S. Cl.
CPC .......... *G07F 17/34* (2013.01); *G07F 17/3267* (2013.01)

(58) Field of Classification Search
CPC .............................. G07F 17/34; G07F 17/3267
See application file for complete search history.

(56) References Cited

U.S. PATENT DOCUMENTS 8,096,869 B2 1/2012 Yoshimi
8,371,928 B2 * 2/2013 Englman .......................... 463/20
2004/0077422 A1 * 4/2004 Bryant ..................... A63F 13/12 472/137
2006/0183534 A1 * 8/2006 Yoshimi ........................... 463/20
2008/0064463 A1 * 3/2008 Bennett ............................ 463/16
2008/0064465 A1 3/2008 Bennett
2008/0113743 A1 * 5/2008 Dunaevsky et al. ............ 463/20
2008/0153563 A1 * 6/2008 Englman ............. G07F 17/3267 463/16
2009/0082087 A1 * 3/2009 Pacey et al. .................... 463/20
(Continued)

OTHER PUBLICATIONS

Patent Examination Report No. 1 (dated Apr. 18, 2013).
(Continued)

*Primary Examiner* — Dmitry Suhol
*Assistant Examiner* — Carl V Larsen
(74) *Attorney, Agent, or Firm* — Howard & Howard Attorneys PLLC

(57) ABSTRACT

A method of allowing a player to play a gaming machine is described herein. The method includes the steps of displaying a game including a plurality of reels including a reel strip having a plurality of normal symbols positions and a plurality of special symbol positions. The method includes randomly generating a first outcome of a game, responsively awarding a first award to the player based on the first game outcome, and determining if a triggering condition occurs in the first game outcome, wherein the triggering condition including a plurality of adjacent special symbol positions being displayed in at least one reel within the display area. The method includes randomly selecting a special symbol and replacing the symbols being displayed in each adjacent special symbol position with the selected special symbol to generate a subsequent second game outcome including the selected special symbol.

34 Claims, 11 Drawing Sheets

(56) References Cited

U.S. PATENT DOCUMENTS

| | | | |
|---|---|---|---|
| 2010/0298042 A1 | 11/2010 | Berman et al. | |
| 2011/0034234 A1 | 2/2011 | Berman et al. | |
| 2011/0117989 A1 | 5/2011 | Kennedy et al. | |
| 2013/0072286 A1 * | 3/2013 | Suda | G07F 17/32 463/20 |

OTHER PUBLICATIONS

Patent Examination Report No. 1 (AU 2014202042)—dated May 7, 2014.
Macau Office Action with English Translation; dated Mar. 9, 2015.

* cited by examiner

GAMING MACHINE AND METHODS OF ALLOWING A PLAYER TO PLAY GAMING MACHINES HAVING REPLACEMENT SYMBOLS

TECHNICAL FIELD

The subject matter disclosed herein relates generally to gaming machines and more particularly, to an apparatus and method for allowing players to play gaming machines having replaceable symbols.

BACKGROUND OF THE INVENTION

Gaming machines, such as slot machines, are a cornerstone of the gaming industry. At least some known gaming machines include a video display device to display a reel game that includes a plurality of reels, wherein each reel includes a reel strip including a plurality of symbols. During game play, the gaming machine accepts a wager from a player, the player selects one or more paylines, the gaming machine spins the reels, and sequentially stops each reel to display the generated combination of symbols on the reels. The gaming machine then awards the player an award based on the combination of symbols orientated along the selected payline.

At least some known gaming machines display reels having one or more wild symbols that may represent any other symbol in a symbol combination. When the wild symbol appears in a combination, at least some known gaming machines will substitute the wild symbol with another symbol to produce a winning combination on the corresponding payline. In known gaming machines, because the wild symbol may represent any other symbol, the wild symbol appears infrequently in the reel strip. Over time, during game play, the player may become frustrated because the wild symbol does not regularly appear in the game outcome. Accordingly, new features are necessary to appeal to player interest and enhance excitement in order to entice longer play and increased profitability. The present invention is directed to satisfying these needs.

SUMMARY OF THE INVENTION

In one aspect of the present invention, a method of allowing a player to play a gaming machine is provided. The method includes the steps of displaying, on a display device, a game including a plurality of reels being displayed in a display area, wherein each reel has a plurality of symbols positions and at least one of the reels having a run of consecutive special symbol positions. Each consecutive special symbol position is populated with a first special symbol. The method includes randomly generating a first outcome, displaying the generated first game outcome in the display area, and responsively awarding a first award to the player based on the first game outcome. The method also includes detecting if a triggering condition occurs in the first game outcome, wherein the triggering condition is defined as at least a portion of the run of consecutive special symbol positions appearing on the at least one of the reels appearing in the first outcome, and responsively replacing the first special symbol in the run of consecutive special symbol positions with a second special symbol to generate a second outcome of the game and awarding a second award to the player based on the second outcome.

In another aspect of the present invention, a gaming machine is provided. The gaming machine includes a display device for displaying a game, a user input device configured to generate a signal indicative of a player's selection input, and a controller coupled to the display device and the user input device for displaying the game including a plurality of reels being displayed in a display area. Each reel has a plurality of symbols positions and at least one of the reels having a run of consecutive special symbol positions. Each consecutive special symbol position is populated with a first special symbol. The controller randomly generates a first outcome and displays the generated first game outcome in the display area. The controller responsively awards a first award to the player based on the first game outcome and detects if a triggering condition occurs in the first game outcome. The triggering condition is defined as at least a portion of the run of consecutive special symbol positions appearing on the at least one of the reels appearing in the first outcome. The controller responsively replaces the first special symbol in the run of consecutive special symbol positions with a second special symbol to generate a second outcome of the game and awarding a second award to the player based on the second outcome.

In yet another aspect of the present invention, a system is provided. The system includes a plurality of gaming devices and a system controller that is coupled to each gaming device. Each gaming device includes a user input device for accepting a player's selection input and a display device. The system controller for displaying a game on at least one gaming device, wherein the game includes a plurality of reels being displayed in a display area. Each reel has a plurality of symbols positions and at least one of the reels having a run of consecutive special symbol positions. Each consecutive special symbol position is populated with a first special symbol. The system controller randomly generates a first outcome and displays the generated first game outcome in the display area. The system controller responsively awards a first award to the player based on the first game outcome and detects if a triggering condition occurs in the first game outcome. The triggering condition is defined as at least a portion of the run of consecutive special symbol positions appearing on the at least one of the reels appearing in the first outcome. The system controller responsively replaces the first special symbol in the run of consecutive special symbol positions with a second special symbol to generate a second outcome of the game and awarding a second award to the player based on the second outcome.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE PREFERRED EMBODIMENT

Figure 1:
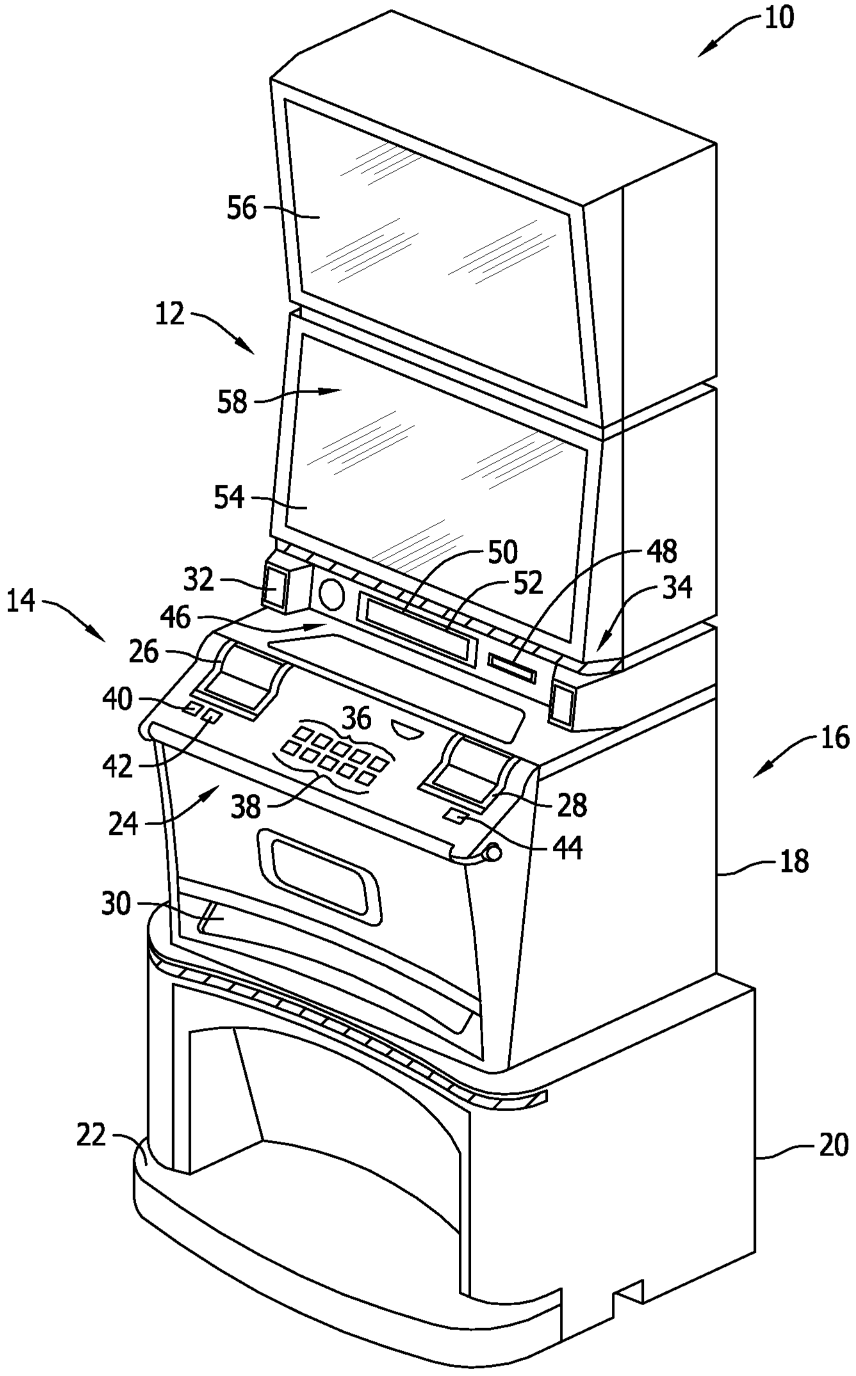
FIG. 1 is a perspective view of an exemplary gaming machine of the present invention.

With reference to the drawings and in operation, the present invention overcomes at least some of the disadvantages of known gaming machines by providing a gaming machine that displays a game including a reel with a plurality of special symbol positions, randomly selects a first special symbol to be displayed in each special symbol position, generates a first outcome of the game including the randomly selected first special symbol, and provides an award to the player based on the first game outcome. The gaming machine also determines if a triggering condition occurs in the first game outcome including the appearance of a plurality of adjacent special symbol positions displayed in the reel, and responsively selects a second special symbol, replaces the first special symbol with the selected second special symbol to generate a second game outcome, and provides a second award to the player based on the generated second outcome. By providing a gaming machine that randomly selects a first symbol to be displayed in each of a plurality of special symbol positions in a first game outcome and randomly selects a second special symbol to replace the first special symbol in a second game outcome, the player's expectation for achieving a win is increased and the enjoyment of the game is improved. Thus, the amount of time that the game is played by patrons of a gaming establishment is thereby increased.

In general, the gaming machine 10 allows a player to initiate a gaming session to play a plurality of video slot games via the gaming machine 10. The gaming machine 10 displays a game, accepts a wager on the game, generates a game outcome including a plurality of symbols at a plurality of symbol positions, and provides an award to the player if a winning combination is displayed in the generated game outcome. During play of the game, the gaming machine 10 displays at least one reel including a plurality of special symbol positions and a plurality of normal symbol positions. The gaming machine 10 randomly generates a first outcome, spins and stops the reel to display the generated first game outcome, and provides a first award to the player if a winning combination appears in the first game outcome. The gaming machine 10 also determines if a triggering condition appears in the first game outcome and randomly selects a special symbol to replace one or more displayed symbols to display a second game outcome. The gaming machine 10 evaluates the second game outcome including the selected special symbol and provides an award to the player based on the second game outcome. In the illustrated embodiment, the triggering condition includes the appearance of a plurality of adjacent special symbol positions being displayed in the at least one reel in the first game outcome. During the second game outcome, the gaming machine 10 replaces each symbol displayed in the adjacent special symbol positions with the selected special symbol. In addition, the gaming machine replaces the symbols without re-spinning the reels such that the second game outcome includes a plurality of symbols previously displayed in the first game outcome and the selected second game symbols. Because the gaming machine 10 replaces the symbols in each of the adjacent special symbol positions with the selected special symbol without re-spinning the reel, the player's anticipation of a winning outcome is increased, thus increasing the period of time the gaming machine 10 is played by the player.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 2:
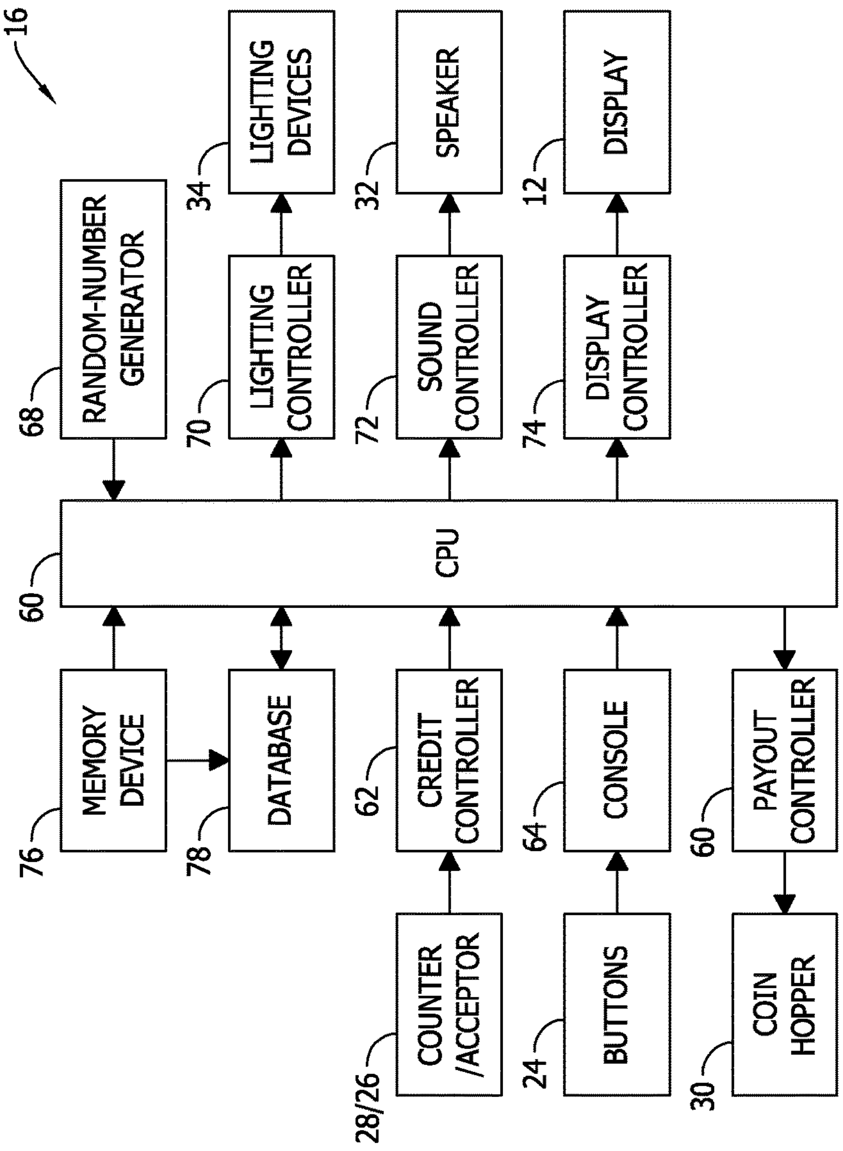
FIG. 2 is a schematic representation of the gaming machine shown in FIG. 1.

FIG. 1 is a perspective view of an exemplary gaming machine 10. FIG. 2 is a schematic representation of the gaming machine 10. A preferred embodiment of the present invention is a video gaming machine preferably installed in a casino. In the illustrated embodiment, the gaming machine 10 includes a display device 12 for displaying a plurality of games, a user input device 14 to enable a player to interface with the gaming machine 10, and a gaming controller 16 that is operatively coupled to the display device 12 and the user input device 14 to enable a player to play games displayed on the display device 12. The gaming machine 10 also includes a cabinet assembly 18 that is configured to support the display device 12, the user input device 14, and/or the gaming controller 16 from a gaming stand 20 and/or a supporting surface 22.

The display device 12 and the user input device 14 are each coupled to the cabinet assembly 18 and are each accessible by the player. In one embodiment, the gaming controller 16 is positioned within the cabinet assembly 18. Alternatively, the gaming controller 16 may be separated from the cabinet assembly 18, and connected to components of the gaming machine 10 through a network such as, for example, a local area network (LAN), a wide area network (WAN), dial-in-connections, cable modems, wireless modems, and/or special high-speed Integrated Services Digital Network (ISDN) lines.

In one embodiment, the user input device 14 includes a plurality of input buttons 24, a coin slot 26, and/or a bill acceptor 28. The coin slot 26 includes an opening that is configured to receive coins and/or tokens deposited by the player into the gaming machine 10. The gaming machine 10 converts a value of the coins and/or tokens to a corresponding amount of gaming credits that are used by the player to wager on games played on the gaming machine 10.

The bill acceptor 28 includes an input and output device that is configured to accept a bill, a ticket, and/or a cash card into the bill acceptor 28 to enable an amount of gaming credits associated with a monetary value of the bills, ticket, and/or cash card to be credited to the gaming machine 10. Moreover, the gaming machine 10 may also utilize a cashless wagering system (not shown), such as a ticket in ticket out (TITO) system (not shown). In one embodiment, the bill acceptor 28 also includes a printer (not shown) that is configured to dispense a printed voucher ticket that includes information indicative of an amount of credits and/or money paid out to the player by the gaming machine 10 during a gaming session. The voucher ticket may be used at other gaming machines, or redeemed for cash, and/or other items as part of a casino cashless system (not shown).

A coin tray 30 is coupled to the cabinet assembly 18 and is configured to receive a plurality of coins that are dispensed from the gaming machine 10. One or more speakers 32 are installed inside the cabinet assembly 18 to generate voice announcements and/or sound effects associated with game play. The gaming machine 10 also includes one or more lighting devices 34 that are configured to blink and/or change brightness and color in specific patterns to produce lighting effects to enhance a visual gaming experience for the player.

In one embodiment, the input buttons 24 include a plurality of BET switches 36 for inputting a wager on a game, a plurality of selection switches 38 for selecting a betting line and/or card, a MAXBET switch 40 for inputting a maximum wager, a PAYOUT switch 42 for ending a gaming session and dispensing accumulated gaming credits to the player, and a start switch, i.e., a SPIN/DEAL button 44 to initiate an output of a game.

In the illustrated embodiment, the BET switches 36 include five switches from 1 BET to 5 BET to enable a player to wager between a minimum bet up to 5× minimum bet. Each selection switch 38 corresponds to a betting line such as, for example, a payline and/or symbol for a reel game, one or more cards for a card game, and/or a symbol for a roulette game, to enable a player to associate a wager with one or more betting lines. The MAXBET switch 40 enables a player to input the maximum bet that a player can spend against one time of a game. The PAYOUT switch 42 enables a player to receive the amount of money and/or credits awarded to the player during a gaming session, which has been credited onto the gaming machine 10.

The gaming machine 10 also includes a player tracking device 46 that is coupled to the gaming controller 16 for identifying the player and/or a player tracking account that is associated with the player. The player tracking account may include, but is not limited to, gaming credits available to the player for use in playing the gaming machine 10. The player tracking device 46 is configured to communicate player account information between a player tracking controller (not shown) and the gaming machine 10. For example, the player tracking device 46 may be used to track bonus points and/or credits awarded to the player during a gaming session and/or track bonus and/or credits downloaded to the gaming machine 10 from the player tracking system.

The player tracking device 46 is coupled to the gaming cabinet assembly 18 and includes a player identification card reader 48, a data display 50, and a keypad 52. The player identification card reader 48 is configured to accept a player tracking card (not shown) inserted by the player, and read information contained on the player tracking card to identify the player account information. The player identification card reader 48 may include, but is not limited to, a barcode reader, a magnetic card reader, and/or a radio frequency identification (RFID) card reader. The keypad 52 is configured to accept a user selection input such as, for example, a unique player personal identification number (PIN) to facilitate enabling the gaming machine 10 to identify the player, and access player account information associated with the identified player to be displayed on the data display 50. In one embodiment, the data display 50 includes a touchscreen panel that includes the keypad 52. Alternatively, the data display 50 and the keypad 52 may be included in the display device 12.

In one embodiment, the display device 12 includes a first display 54 and a second display 56. The first display 54 is configured to display a game screen 58 (shown in FIG. 3) including indicia and/or symbols for use in a game, e.g., cards used by a card game, roulette wheel and symbols used in a roulette game, and reels used in a reel game. The game screen 58 may include any type of game including, but not limited to, a video slot game, a keno game, a blackjack game, a video poker game, or any type of game which allows a player to make a wager, play a game, and potentially provide the player an award based on an outcome of the game and a paytable. The second display 56 is configured to display game play instructions for performing the game including, but not limited to, playing instructions, paytables, paylines, betting lines and/or any other information to enable the gaming machine 10 to function as described herein. Moreover, each display 54 and 56 may be configured to display at least a portion of the game screen 58 and/or game play instructions. In one embodiment, the first and second displays 54 and 56 each include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. Alternatively, a single component, such as a touch screen, may function as both the display device 12 and as the user input device 14. In an alternative embodiment, the first display 54 and/or the second display 56 includes a plurality of mechanical reels displaying a plurality of game symbols.

Referring to FIG. 2, in one embodiment, the gaming controller 16 includes a processor, i.e., a central processing unit (CPU) 60, a credit controller 62, a console unit 64, a payout controller 66, a random-number generator (RNG) 68, a lighting controller 70, a sound controller 72, a display controller 74, a memory device 76, and a database 78. Memory device 76 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 60 to store, retrieve, and/or execute instructions and/or data.

The CPU 60 executes various programs, and thereby controls other components of the gaming controller 16 according to player instructions and data accepted by the user input device 14. The CPU 60 in particular executes a game program, and thereby conducts a game in accordance with the embodiments described herein. The memory device 76 stores programs and databases used by the CPU 60. Moreover, the memory device 76 stores and retrieves information in the database 78 including, but not limited to, a game type, a number of reels associated with a game, a number of reel strips associated with each reel, a number of symbol positions being displayed on each reel strip, a type of symbols being displayed with each symbol position, a predefined set of normal symbols, a predefined set of special symbols, image data for producing game images and/or screens on the display device 12, and temporarily stores variables, parameters, and the like that are used by the CPU 60. In addition, the memory device 76 stores indicia, symbol weights, paytables, and/or winning combination tables which represent relationships between combinations of random numbers and types of awards. In one embodiment, the memory device 76 utilizes RAM to temporarily store programs and data necessary for the progress of the game, and EPROM to store, in advance, programs and data for controlling basic operation of the gaming machine 10, such as the booting operation thereof.

The credit controller 62 manages the amount of player's credits, which is equivalent to the amount of coins and bills counted and validated by the bill acceptor 28. The console unit 64 is coupled to the user input device 14 to monitor player selections received through the input buttons 24, and accept various instructions and data that a player enters through the input buttons 24. The payout controller 66 converts a player's credits to coins, bills, or other monetary data by using the coin tray 30 and/or for use in dispensing a credit voucher via the bill acceptor 28.

The lighting controller 70 controls one or more lighting devices 34 to blink and/or change brightness and color in specific patterns in order to produce lighting effects associated with game play. The sound controller 72 controls the speakers 32 to output voice announcements and sound effects during game play. The display controller 74 controls the display device 12 to display various images on screens preferably by using computer graphics and image data stored in the memory device 76. More specifically, the display controller 74 controls video reels in a game screen displayed on the first display 54 and/or the second display 56 by using computer graphics and the image data.

The RNG 68 generates and outputs random numbers to the CPU 60 preferably at the start of each round of a game. The CPU 60 uses the random numbers to determine an outcome of the games. For example, if the game is a video slot game, the CPU 60 uses the RNG 68 to randomly select an arrangement of symbols to be displayed on video reels. Moreover, the CPU 60 generally uses random numbers generated by the RNG 68 to play the games and to determine whether or not to provide an award to a player. In addition, the CPU 60 generates game outcomes including combinations of random numbers, and compares the generated combinations with winning combinations stored in the winning combination table to determine if the generated outcome is a winning outcome that is associated with a type of award.

Figure 3:
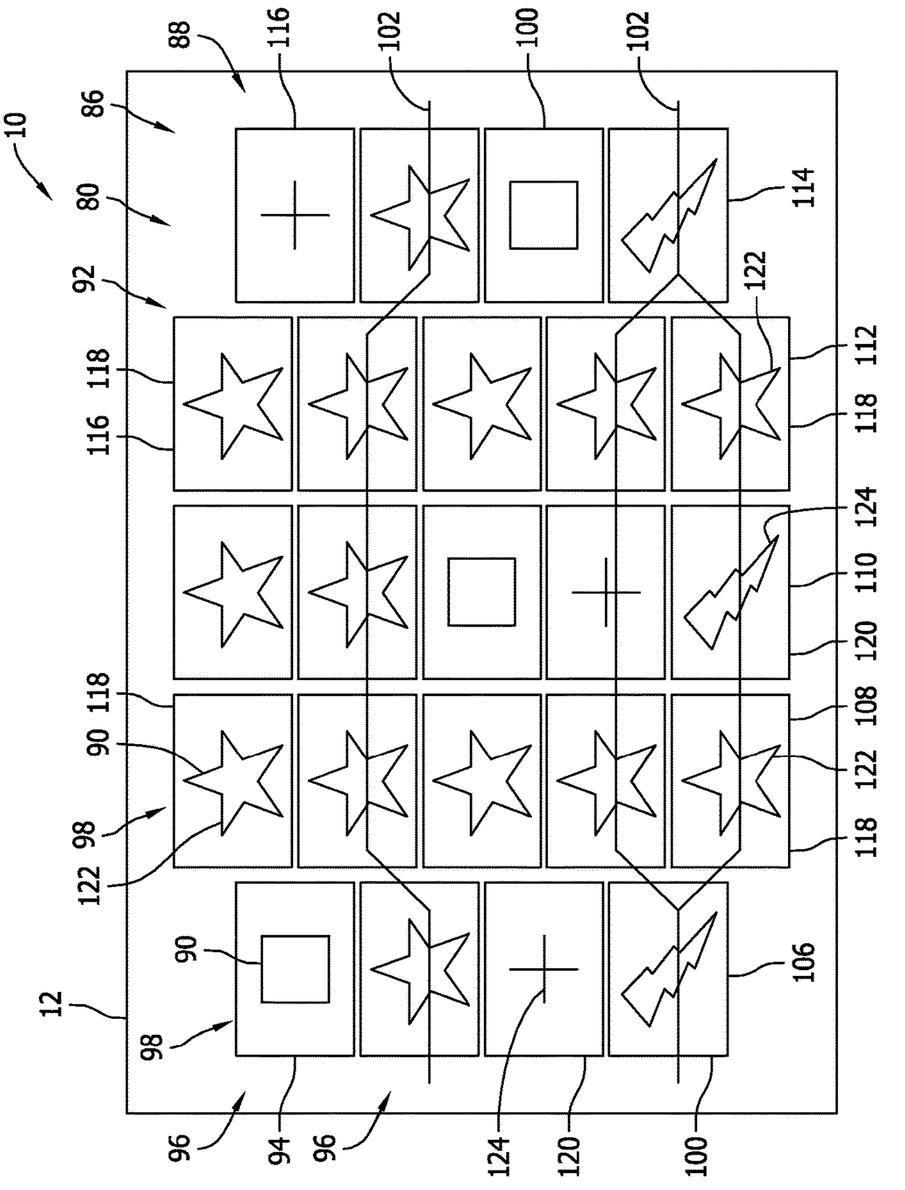
FIG. 3 is a first graphical display of a video slot game including a plurality of slot reels, according to an embodiment of the present invention.
Figure 4:
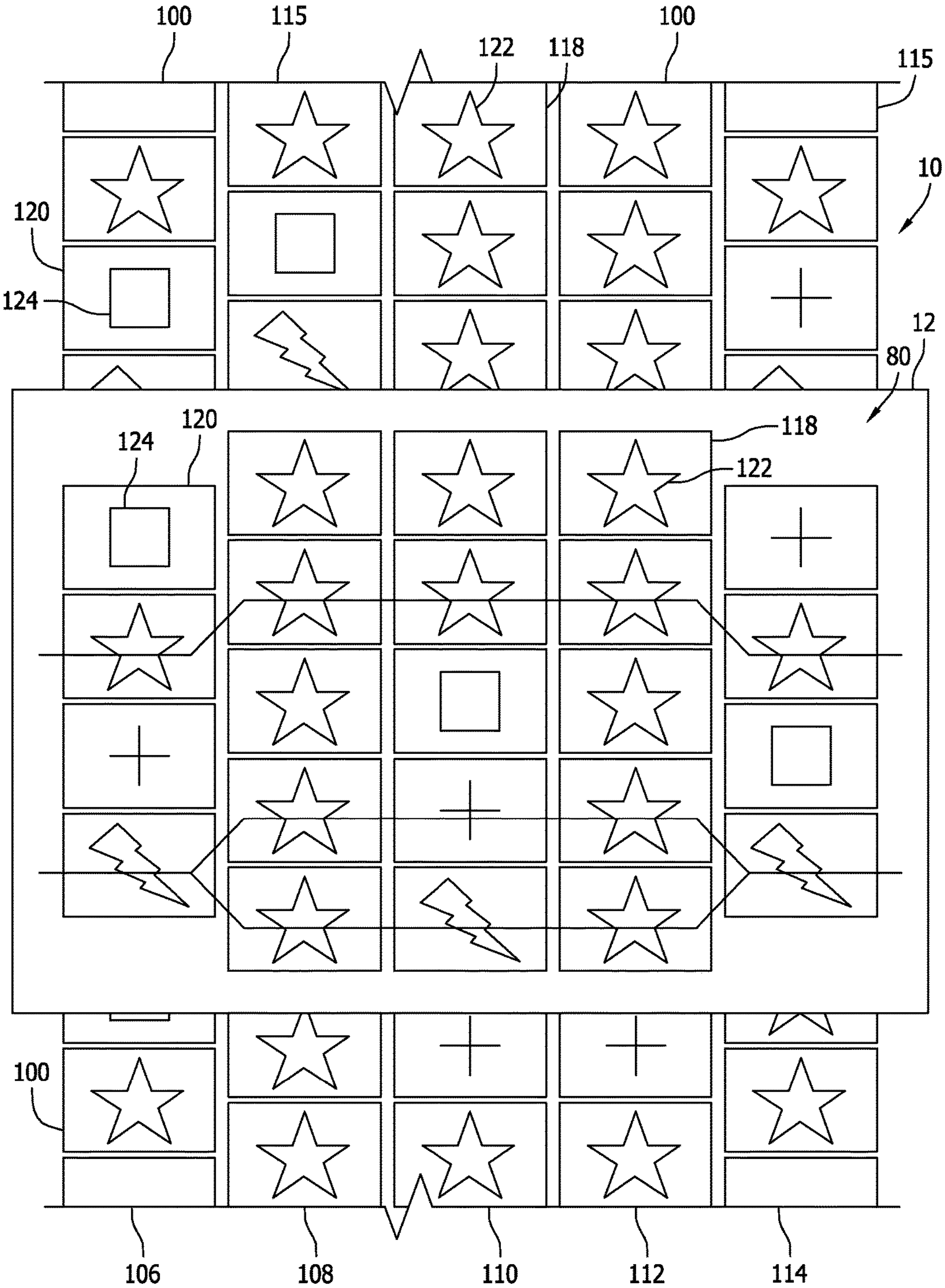
FIG. 4 is a schematic representation of a portion of the gaming machine shown in FIG. 1 including the slot game of FIG. 3 illustrating a plurality of slot reels, according to an embodiment of the present invention.
Figure 5:
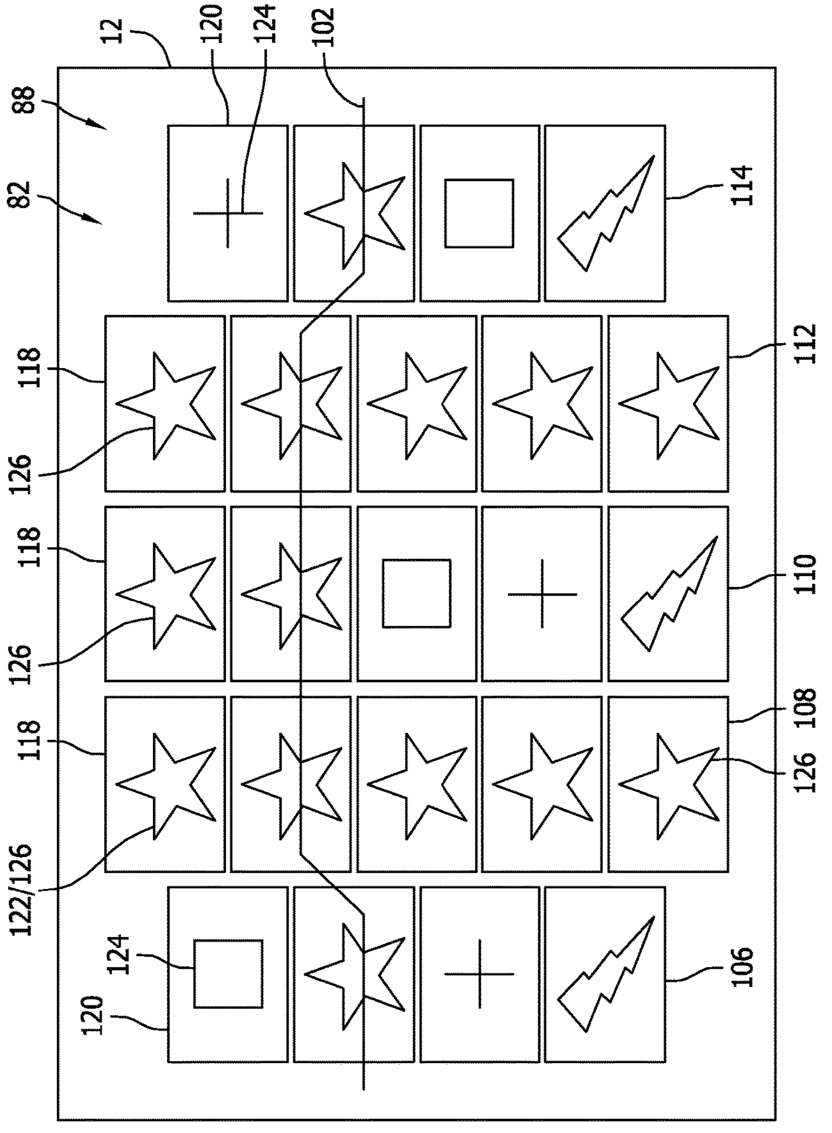
FIG. 5 is a second graphical display of the slot game of FIG. 3, according to an embodiment of the present invention.
Figure 6:
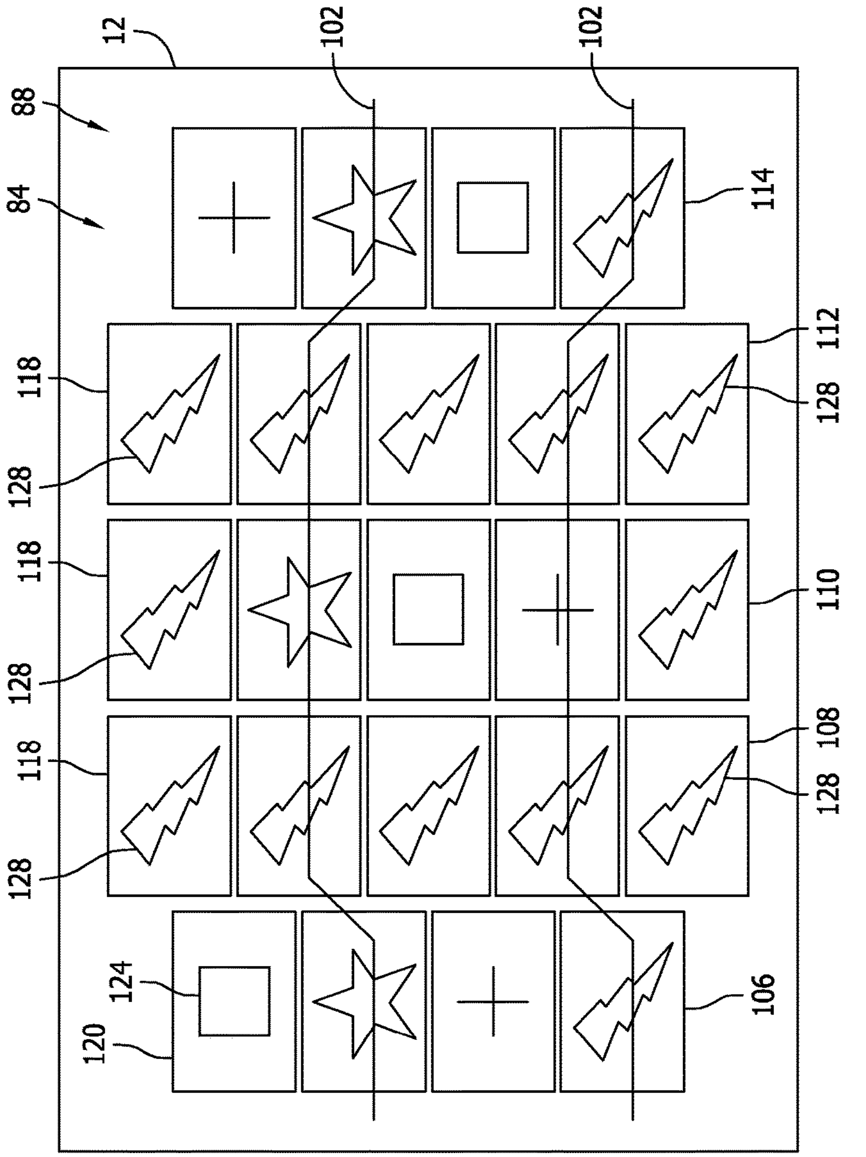
FIG. 6 is a third graphical display of the slot game of FIG. 3, according to an embodiment of the present invention.

FIG. 3 is an exemplary graphical display of a game 80 that is displayed by the gaming machine 10. FIG. 4 is a schematic representation of a portion of the gaming machine 10 including the game 80. FIG. 5 is a graphical display of a first outcome 82 of the game 80 that is displayed by the gaming machine 10. FIG. 6 is a graphical display of a second outcome 84 of the game 80 that is displayed by the gaming machine 10.

In the illustrated embodiment, the gaming controller 16 is configured to display the game 80 on the display device 12. In one embodiment, the game 80 is a video slot game. However, it should be noted that the game 80 may be any type of game upon which a player could make a wager including, but not limited to a keno game, a blackjack game, a video poker game, or any type of game that enables the gaming controller 16 to function as described herein. In the illustrated embodiment, the game 80 is displayed on the first display 54. Alternatively, the game 80 may be displayed on the first display 54 and/or the second display 56.

In general, during play of the game 80, the gaming controller 16 randomly generates an outcome 86 of the game 80 and displays the generated game outcome 86 in a display area 88. The gaming controller 16 randomly selects a plurality of game symbols 90 from a predefined set of possible game symbols and displays the selected game symbols 90 associated with the generated game outcome 86 in the game display area 88.

In the illustrated embodiment, the plurality of symbols 90 are displayed in a grid 92 having a plurality of cells 94 arranged along a plurality of rows 96 and a plurality of columns 98. Each cell 94 displays one or more game symbols 90 associated with the game outcome 86. In the illustrated embodiment, the gaming controller 16 displays the game symbols 90 within a plurality of reels 100. Each reel 100 is associated with a corresponding column 98. The game 80, in the illustrated embodiment, includes 5 reels 100 with 4, 5, 5, 5, and 4 cells per reel, respectively (a "4-5-5-5-4" arrangement) displayed in the display area 88. Alternatively, other reel arrangements may be used such as, for example, 3-4-3-4-3, or 4-5-4-5-4 arrangements or arrangements with the same number of cells per column, such as 3×3, 3×4, 4×5, or 5×5 configurations. The game 80 also includes a plurality of paylines 102 that extend across one or more cells 94 to indicate, to the player, a combination of game symbols 90. In one embodiment, the gaming machine 10 displays the game 80 via a plurality of mechanical reels (not shown) that include a plurality of symbols displayed on a circumferential surface of each reel.

Each slot game is generally played in a conventional manner. The player makes a wager, which may be based on a predetermined denomination and a selected number of paylines, the gaming controller 16 randomly generates an outcome for the game, spins the reels, and selectively stops the reels to display a game symbol 90 in each of the display cells 94. If a predetermined pattern of symbols 90 is randomly chosen for each cell 94 on a played payline 102, the player may be awarded a payout based on the payline, the wager, and a predetermined paytable. Moreover, the player may be awarded a payout if the combination of symbols associated with a selected payline is a winning combination. In addition, a player may receive a bonus feature and/or a bonus game based on the combination of symbols associated with the selected payline and/or the appearance of one or more predefined symbols in the game outcome 86. Many variations to the above described general play of a slot game fall within the scope of the present invention. Such slot games are well-known in the art, and are therefore not further discussed.

In the illustrated embodiment, the gaming controller 16 receives a signal, from the user input device 14, that is indicative of a player's selection to initiate a gaming session including a wager amount, and a selection of one or more paylines 102 associated with a predefined set of cells 94 within the displayed grid 92. In the illustrated embodiment, the game 80 is a multi-line game, i.e., the paylines include horizontal paylines and/or diagonal pay-lines, and/or zig-zag paylines. Moreover, the user input device 14 may allow the player to toggle to increase the bet per payline a credit at a time (up to the maximum bet). The gaming controller 16 randomly generates an outcome of the game 80, and displays the generated outcome on the display device 12. In one embodiment, the gaming controller 16 is configured to rotate, and/or spin each reel 100 to initiate a game play, and stop each reel 100 to display a plurality of symbols 90 associated with the randomly generated outcome. In addition, the gaming controller 16 is adapted to determine if the generated outcome is a winning outcome based on the displayed game symbols 90, a pay-table, a wager, and one or more player selected paylines 102. More specifically, the gaming controller 16 determines if a combination of symbols 90 arranged along the selected payline 102 is a winning combination. The gaming controller 16 may provide an award in response to the outcome of the game 80. In general, the term "award" may be a payout, in terms of credits or money. Thus, the gaming controller 16 may award a regular payout in response to the outcome of the primary game 80. However, it should be noted that the term award may also refer to other types of awards, including, prizes, e.g., meals, show tickets, etc. . . . , as well as in-game award, such as free games or awarding the player one or more wild symbols or stacked wild symbols in each of the games.

The gaming controller 16 is configured to display the game 80 including a plurality of reels 100. For example, in one embodiment, the gaming controller 16 displays the game 80 having five reels 100 orientated horizontally and including a 1$^{st}$ reel 106, a 2$^{nd}$ reel 108, a 3$^{rd}$ reel 110, a 4$^{th}$ reel 112, and a 5$^{th}$ reel 114. Each reel 100 includes one or more associated reel strips 115 (shown in FIGS. 7-9) that may be displayed on the respective reel 100. Each reel strip 115 includes a plurality of symbol positions 116 that each having a game symbol 90 displayed therein. During display of the generated game outcome 86, the gaming controller 16 spins each reel 100 such that the game symbols 90 are moved through each of the cells 94 in the display area 88.

In the illustrated embodiment, each reel 100 includes a reel strip 115 having a plurality of symbol positions 116 including a plurality of special symbol positions 118 and a plurality of normal symbol positions 120. Moreover, the reel strip 115 includes at least one run of consecutive special symbol positions 118 that include a plurality of adjacent special symbol positions 118. During a round of the game 80, the gaming controller 16 randomly selects at least one special symbol 122 (shown as a "star" symbol in FIGS. 3 and 4) from a predefined set of special symbols 122, and displays the selected special symbol 122 in each special symbol position 118 such that each special symbol position 118 includes the selected special symbol 122. In the illustrated embodiment, the gaming controller 16 displays the same special symbol 122 in each special symbol position 118. Alternatively, the gaming controller 16 may select a plurality of similar special symbols and/or a plurality of associated special symbols such as, for example, a set of special symbols included in a category of special symbols, for display in each special symbol position 118. For example, the predefined set of special symbols may include, but is not limited to, a category of special symbols such as, for example, shapes, colors, sounds, items, characters, backgrounds, frames, and/or any category of special symbols that enable the gaming controller 16 to function as described herein. Each special symbol category includes a plurality of special symbols having predefined characteristics associated with the special symbol category. For example, the predefined set of special symbols may include a shape category that includes a plurality of special symbols that each have a shape associated with the shape category. The gaming controller 16 may select one or more special symbols indicative of the shapes within the shape category, and display the selected special symbols in each of the special symbol positions 118.

In the illustrated embodiment, each reel strip 115 also includes a plurality of normal symbols 124 that are displayed in each normal symbol position 120. In the illustrated embodiment, the normal symbols 124 are static symbols wherein each normal symbol 124 appears in the associated normal symbol position 120 for each round of the game 80. Alternatively, the gaming controller 16 may randomly select a plurality of normal symbols 124 from a predefined set of normal symbols 124, and display the selected normal symbols 124 in each of the normal symbol positions 120. In addition, the predefined set of normal symbols 124 may include any game symbol not included in the predefined set of special symbols 122.

Referring to FIGS. 5 and 6, during game play, the gaming controller 16 randomly generates a first game outcome 82 (shown in FIG. 5) and displays the first game outcome 82 on the display device 12. More specifically, the gaming controller 16 spins and stops each of the reels 100 to display the first game outcome 82 in the display area 88. The gaming controller 16 also evaluates the first game outcome 82 and provides a first award to the player that is determined as a function of the symbols 90 displayed in the first game outcome 82, the player's wager, the selected paylines, and a paytable.

The gaming controller 16 also detects whether a triggering condition occurs in the first game outcome 82 and responsively generates a subsequent second game outcome 84 (shown in FIG. 6) if the triggering condition is detected in the first game outcome 82. Moreover, the gaming controller 16 randomly selects a special symbol 122 to be displayed in each of the special symbol positions 118 displayed on the reels 100 in the first game outcome 82 and generates the second game outcome 84 including the selected special symbol 122 displayed in the special symbol positions 118. The gaming controller 16 evaluates the second game outcome 84 including the selected special symbol 122 and provides the player a second award that is determined as a function of the second game outcome 84.

In the illustrated embodiment, the gaming controller 16 randomly selects a first special symbol 126 from a predefined set of special symbols 122 for display in each of the special symbol positions 118 and generates the first game outcome 82 including the selected first special symbol 126. The gaming controller 16 spins and stops the reels 100 to display the first game outcome 82 and provides an award to the player based on the first game outcome 82. In the illustrated embodiment, during display of the first game outcome 82, the gaming controller 16 replaces each symbol displayed in the special symbol positions 118 with the selected first special symbol 126 while the reels 100 are spinning such that the symbol replacement is visible to the player. Alternatively, the gaming controller 16 may replace each symbol displayed in the special symbol positions with the selected first special symbol 126 before the reels 100 are spun, or after one or more reels 100 has been stopped.

The gaming controller 16 also detects if the triggering condition occurs in the first game outcome 82. Upon detecting the triggering condition in the first game outcome 82, the gaming machine randomly selects a second special symbol 128 from the predefined set of special symbols and generates the second game outcome 84 including the selected second special symbol 128 displayed in each special symbol position 118 displayed in display area 88. More specifically, the gaming controller 16 generates the second game outcome 84 by replacing the first special symbol 126 with the selected second special symbol 128 without re-spinning the reels 100. The gaming controller 16 evaluates the second game outcome 84 including the randomly selected second special symbols 128 and provides a second award to the player that is determined as a function of the second game outcome 84. In one embodiment, the first special symbol 126 is selected from a first predefined set of special symbols and the second special symbol 128 is selected from a second predefined set of special symbols having symbols that are different from the symbols included in the first predefined set. In addition, each subsequent second special symbol 128 may be selected from a different predefined set of special symbols.

In the illustrated embodiment, the triggering condition includes the appearance of special symbol positions 118 in at least one reel 100 of the plurality of reels 100 displayed in the first game outcome 82. More specifically, the triggering condition is as at least a portion of the run of consecutive special symbol positions 118 appearing on the at least one of the reels 100 appearing in the first outcome 82. Upon detecting the triggering condition in the first game outcome 82, the gaming controller 16 replaces each first special symbol 126 displayed in the special symbol positions 118 with the randomly selected second special symbol 128 to generate the second game outcome 84. In one embodiment, the triggering condition includes a predefined number of consecutive special symbol positions 118 displayed in at least one reel 100 in the first game outcome 82. For example, in one embodiment, a reel 100 may include an n number of cells 94 displayed in the grid 92, and the triggering condition may include the first game outcome 82 having the first special symbol 126 displayed in n−1 cells 94 of the reel 100. In another embodiment, the triggering condition may also include the first special symbol 126 displayed in each symbol position of the reel 100 that is displayed in the first game outcome 82 such that the first special symbol 126 is displayed in each visible cell 94 in the associated reel 100. In one embodiment, the triggering condition may also include a plurality of special symbol positions 118 displayed in a predetermined reel 100 such as, for example, the $2^{nd}$ reel 108. In addition, the triggering condition may also include a plurality of special symbol positions 118 displayed in at least two predetermined reels 100 such as, for example, the $2^{nd}$ reel 108 and the $4^{th}$ reel 112. Moreover, the triggering condition may include a special symbol position 118 displayed in each visible cell 94 of the $2^{nd}$ reel 108 and the $4^{th}$ reel 112, respectively.

In the illustrated embodiment, the triggering condition is detected if the first selected special symbol 126 is displayed in each special symbol position 118 within the $2^{nd}$ reel 108 and the $4^{th}$ reel 112 displayed in the first game outcome 82. Upon detecting the triggering condition, the gaming controller 16 randomly selects the second special symbol 128 and replaces each first special symbol 126 with the selected second special symbol 128 to generate the second game outcome 84 such that, in the second game outcome 84 each displayed special symbol position 118 within the $2^{nd}$ reel 108 and $4^{th}$ reel 112 displays the selected second special symbol 128. In the illustrated embodiment, the gaming controller 16 replaces the first special symbols 126 without re-spinning the reels 100 such that the symbol replacement is visible to the player. Alternatively, the gaming controller 16 may re-spin the reels 100 including the special symbol positions 118 and replace the special symbols 122 during the re-spin such that the symbol replacement is visible to the player. For example, in one embodiment, upon detecting the triggering condition including a plurality of first special symbols 126 displayed in the $2^{nd}$ reel 108 and the $4^{th}$ reel 112, the gaming controller 16 may re-spin the $2^{nd}$ reel 108 and the $4^{th}$ reel 112, with the $1^{st}$, $3^{rd}$, and $5^{th}$ reels 106, 110, and 114 held in position, to replace the first special symbols 126 with the second special symbols 128 and stop the $2^{nd}$ and $4^{th}$ reels 108 and 112 to display the second game outcome 84.

In the illustrated embodiment, upon detecting the triggering condition in the first game outcome 82, the gaming controller 16 randomly determines a number of second game outcomes 84 to be generated and randomly determines a special symbol 122 to be displayed for each subsequent second game outcome 84. Moreover, during each subsequent game outcome, the gaming controller 16 randomly selects a special symbol and replaces the previously displayed special symbol with the selected special symbol. For example, in one embodiment, upon detecting the triggering condition in the first game outcome 82, the gaming controller 16 may randomly determine the number of subsequent game outcomes to be equal to two subsequent outcomes. During the subsequent second game outcome 84, the gaming controller 16 may randomly select a second special symbol 128 and replace the first special symbol 126 in the first game outcome 82 with the selected second special symbol 128 to generate the second game outcome 84. The gaming controller 16 may then randomly select a third special symbol (not shown) and replace the second special symbol 128 with the selected third special symbol to display a third game outcome (not shown) including the selected third special symbol.

In one embodiment, the gaming controller 16 may determine the number of subsequent game outcomes to be displayed based on the first special symbol 126. For example, in one embodiment, each special symbol 122 may be associated with a predefined number of game outcomes. The gaming controller 16 determines the special symbol 122 displayed in the first game outcome 82 and generates the corresponding number of subsequent second game outcomes 84 associated with the displayed first outcome special symbol 126.

In one embodiment, the gaming controller 16 may continually generate subsequent game outcomes until a terminating condition occurs. For example, for each subsequent game outcome, the gaming controller 16 determines if a terminating condition occurs in the current game outcome and generates another subsequent game outcome if the terminating condition does not appear in the current game outcome. In addition, the gaming controller 16 does not generate a subsequent game outcome if the terminating condition occurs in the current game outcome. In the illustrated embodiment, the terminating condition includes the appearance of a predefined special symbol 122 displayed in the corresponding game outcome. In another embodiment, the terminating condition may include a predefined number of generated subsequent game outcomes such as, for example, generating five subsequent game outcomes, wherein the gaming controller 16 stops generating subsequent game outcomes after the $5^{th}$ game outcome has been displayed.

In the illustrated embodiment, the gaming controller 16 evaluates each subsequent second game outcome 84 and provides an award to the player after each subsequent second game outcome 84. Alternatively, the gaming controller 16 may evaluate the last game outcome that is displayed and provide the second award based on the last displayed game outcome.

In one embodiment, the gaming controller 16 provides an award to the player that is determined as a function of the number of subsequent game outcomes 84 that are displayed. In addition, the gaming controller 16 may also provide an enhanced award based on the number of game outcomes that are displayed. For example, in one embodiment, the gaming controller 16 may provide a progressive award if the number of displayed outcomes is greater than a predefined number of game outcomes such as, for example, if four or more subsequent game outcomes are displayed. Moreover, the gaming controller 16 may also provide an award multiplier based on the number of subsequent game outcomes that are displayed. For example, the gaming controller 16 may award a first award multiplier having a first multiplier value if the gaming controller 16 displays a first number of subsequent game outcomes, and the gaming controller 16 may award a second award multiplier having a second multiplier value that is greater than the first multiplier value if the gaming controller 16 displays a second number of subsequent game outcomes that is greater than the first number. For example, the gaming controller 16 may award a 2× multiplier for each 2 subsequent game outcomes that are displayed. Moreover, in one embodiment, the gaming controller 16 may award a 2× multiplier after a total of 2 subsequent game outcomes are displayed, and award a 4× multiplier after a total of 4 subsequent game outcomes are displayed. In addition, in one embodiment, the gaming controller 16 may increase the award multiplier for every 2 additional subsequent game outcomes that are displayed.

In one embodiment, each special symbol 122 includes a probability of selection based on the sequential number of the current game outcome being displayed. For example, the probability of selecting a special symbol for each subsequent game outcome may be provided as in the following chart.

| Game | Probability of Selecting a Special Symbol | | | | |
|---|---|---|---|---|---|
| Outcome | Symbol A | Symbol B | Symbol C | Symbol D | Symbol E |
| $1^{st}$ | 10% | 20% | 40% | 10% | 20% |
| $2^{nd}$ | 80% | 5% | 5% | 5% | 5% |
| $3^{rd}$ | 20% | 20% | 20% | 20% | 20% |
| $4^{th}$ | 50% | 10% | 10% | 20% | 10% |
| $5^{th}$ | 50% | 20% | 5% | 20% | 5% |
| $N^{th}$ | 20% | 20% | 20% | 20% | 20% |

The first column represents the sequential number of subsequent game outcomes. The second column represents the probability of selecting Symbol A associated with each sequential game outcome. The third, fourth, fifth, and sixth columns represent the probability of selecting Symbol B, Symbol C, Symbol D, and Symbol E, respectively, for display with the corresponding game outcomes.

In the illustrated embodiment, the gaming controller 16 determines the sequential number of the game outcome currently being displayed and selects a special symbol for display in the current game outcome based on the associated probabilities of selection. For example, if the gaming controller 16 determines that 4 subsequent game outcomes are to be displayed, the gaming controller 16 determines that Symbol A has a 10% probability of being selected during the $1^{st}$ subsequent game outcome, an 80% probability of being selected during the $2^{nd}$ subsequent game outcome, an 20% probability of being selected during the $3^{rd}$ subsequent game outcome, and a 50% probability of being selected during the $4^{th}$ subsequent game outcome.

Figure 7:
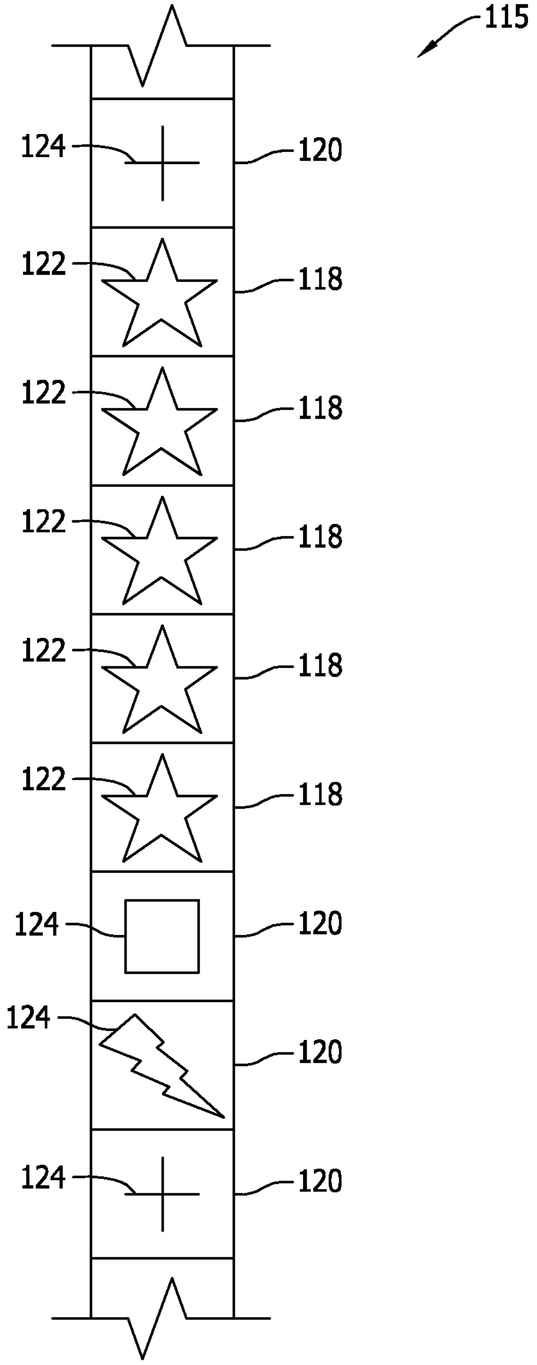
FIG. 7 is a schematic representation of a reel strip that may be used with at least one slot reel of the video slot game shown in FIGS. 3-6, according to an embodiment of the present invention.
Figure 8:
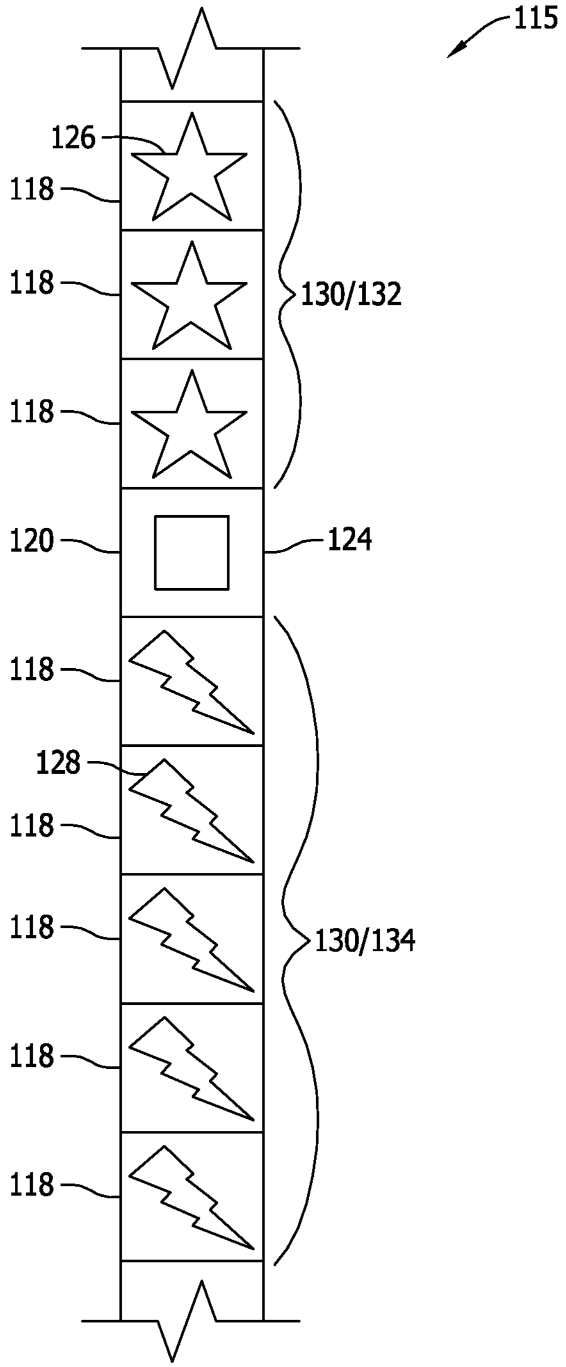
FIG. 8 is another schematic representation of the reel strip shown in FIG. 7, according to an embodiment of the present invention.
Figure 9:
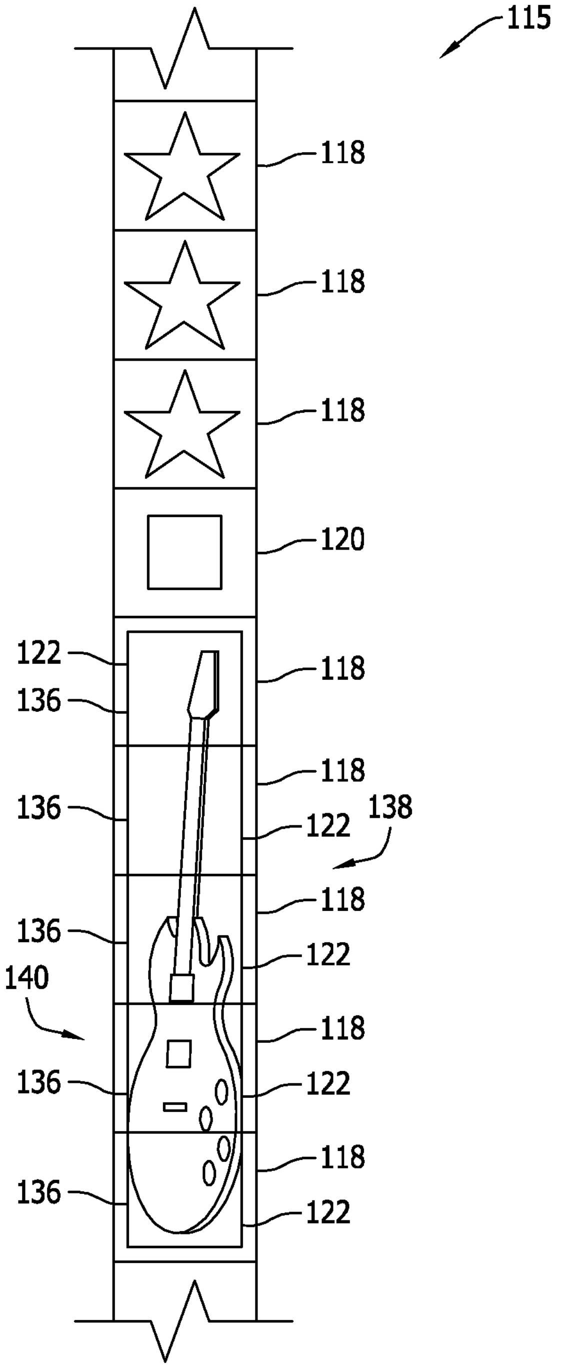
FIG. 9 is another schematic representation of the reel strip shown in FIG. 7, according to an embodiment of the present invention.

FIGS. 7-9 are schematic representations of a reel strip 115 that may be used with each slot reel 100. In the illustrated embodiment, the reel strip 115 includes a plurality of adjacent special symbol positions 118 and a plurality of normal symbol position 120. Each normal symbol position 120 includes a static normal symbol 124. During each play of the game 80, the gaming controller randomly selects at least one special symbol 122 from the predefined set of special symbols 122, and displays the selected special symbol 122 in each special symbol positions 118. Additional details of adjacent special symbol positions, which may be used in the present invention, are described in U.S. patent application Ser. No. 11/299,009 to Yoshimi, now U.S. Pat. No. 8,096,869, filed Dec. 9, 2005, titled "Gaming Machine with Runs of Consecutive Identical Symbols", which is incorporated herein by reference in its entirety.

Referring to FIG. 8, in one embodiment, the reel strip 115 may include a plurality of groups 130 of adjacent special symbol positions 118. For example, in one embodiment, the gaming controller 16 may display the reel strip 115 including at least two groups 130 of adjacent special symbol positions 118. During game play, the gaming controller 16 randomly selects a special symbol 122 and displays the selected special symbol 122 in each special symbol position 118 of the groups 130. Moreover, the reel strip 115 may include at least one normal symbol position 120 displayed between the groups 130 of adjacent special symbol positions 118.

In one embodiment, the gaming controller 16 may randomly select a different special symbol 122 to be displayed in each of the groups 130 and display a corresponding selected special symbol 122 in each special symbol position 118 of the associated group 130. For example, in one embodiment, the gaming controller 16 may select a first special symbol 126 to be displayed in a first group 132 of adjacent special symbol positions 118, and select a second special symbol 128 to be displayed in a second group 134 of special symbol position 118. In one embodiment, the first special symbol 126 and the second special symbol 128 are different. In another embodiment, the first special symbol 126 and the second special symbol 128 are similar. Moreover, the first and second special symbols 126 and 128 may be the same special symbol. In addition, the first and second special symbols 126 and 128 may be selected from the same category of special symbols and/or be selected from different categories of special symbols.

Referring to FIG. 9, in one embodiment, the gaming controller 16 may display a special symbol 122 having a plurality of symbol images 136 such that a plurality of adjacent special symbols 122 are displayed as a unitary image 138 that extends across the plurality of special symbol positions 118. For example, as shown in FIG. 9, the gaming controller 16 may randomly select a special symbol 122 to be displayed in each special symbol position 118 of a group 130, wherein the selected special symbol 122 includes a plurality of symbol images 136. Each selected special symbol 122 is displayed in each of the adjacent special symbol positions 118 with a different symbol image 136 such that a unitary symbol image 138 extends across each adjacent special symbol position 118. For example, as shown in FIG. 9, the gaming controller 16 may display each selected special symbol 122 having a different symbol image 136 such that a unitary guitar image 140 is displayed across each adjacent special symbol position 118.

In another embodiment, the gaming controller 16 selects a plurality of special symbols 122 from the same category of special symbols, wherein each selected special symbol 122 forms a portion of the unitary symbol image 138 such that when the selected special symbols 122 are displayed in each adjacent special symbol position 118, the unitary symbol image 138 is displayed across the adjacent special symbol positions 118.

Figure 10:
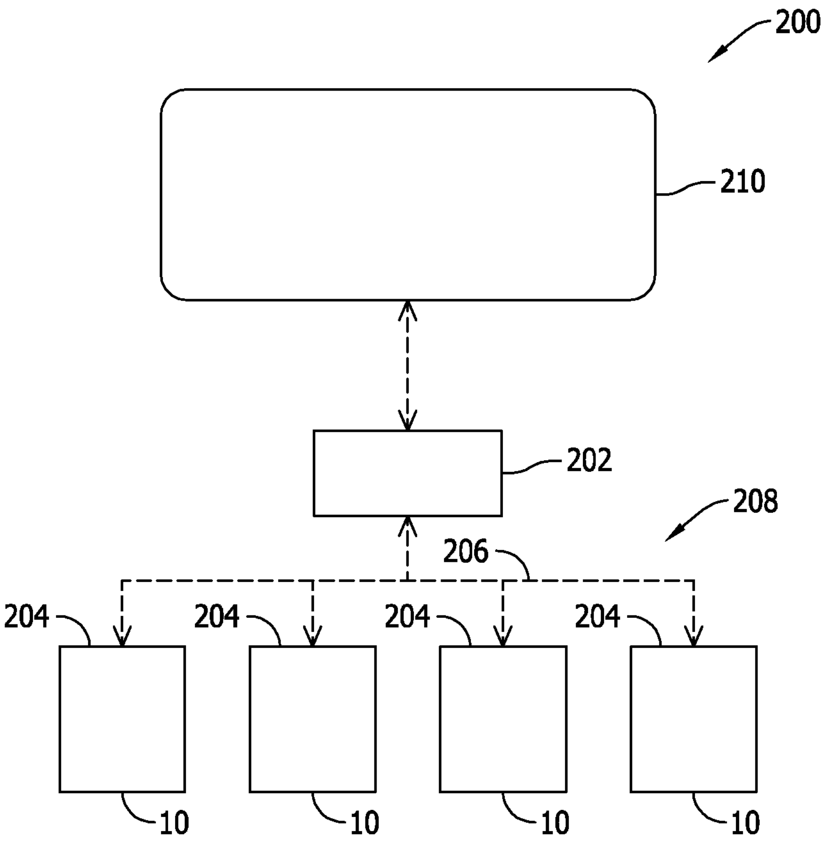
FIG. 10 is a schematic view of an exemplary gaming system of the present invention.

FIG. 10 is a schematic view of an exemplary gaming system 200. The gaming system 200 includes a system controller 202 and one or more gaming devices 204 that are coupled to the system controller 202. In one embodiment, the gaming device 204 includes the gaming machine 10. In another embodiment, gaming device 204 may include a personal computer, laptop, cell phone, smartphone, tablet computer, personal data assistant, and/or any suitable computing device that enables a player to connect to system controller 202 to play the game 80.

In the illustrated embodiment, the system controller 202 is configured to perform all of the functions of the gaming controller 16 as described herein. The system controller 202 communicates with each gaming device 204 for playing the game 80 on each gaming device 204 based on user selection input received from each gaming device 204. In the illustrated embodiment, the system controller 202 plays a separate instance of the game 80 on each gaming device 204 such that each player associated with the gaming devices 204 may play a separate instance of the game 80 simultaneously.

Referring to FIG. 3, in the illustrated embodiment, the system controller 202 displays the game 80 on at least one of the gaming devices 204. Moreover, the system controller 202 displays the game 80 including at least one reel 100 having a reel strip 115 including a plurality of normal symbol positions 120 and a plurality of special symbol positions 118. During game play, the system controller 202 randomly selects a first special symbol 126 and displays the selected first special symbol 126 in each of the special symbol position 118. The system controller 202 also generates a first game outcome 82 including the at least one reel 100 and provides a first award that is determined as a function of the first game outcome 82. The system controller 202 also determines if a triggering condition occurs in the first game outcome 82 including the appearance of the first special symbol 126 in each of the symbol positions 118 of the at least one reel 100 displayed in the display area 88. Upon detecting the occurrence of the triggering condition, the system controller 202 randomly selects a second special symbol 128 and replaces each first special symbol 126 with the selected second special symbol 128 to generate a second game outcome 84. The system controller 202 also evaluates the second game outcome 84 and provides a second award to the player that is determined as a function of the second game outcome 84.

In the illustrated embodiment, the gaming machines 10 and the system controller 202 are coupled in communication with a local area network (LAN) 206. Alternatively, the gaming machines 10 and the system controller 202 may be coupled via a network such as, for example, an Internet link, an intranet, a WAN, dial-in-connections, cable modems, wireless modems, and/or ISDN lines. In the illustrated embodiment, the gaming system 200 includes four gaming machines 10, which in one embodiment as shown in FIG. 10 are arranged in a bank 208, i.e., are arranged together, adjacently. It should be noted, however, that the gaming system 200 may include any number of gaming machines 10 that may be arranged in any manner, such as in a circle or along a curved arc, or positioned within separate areas of a casino floor, and/or separate gaming establishments such as different casinos. Furthermore, additional groups of gaming machines 10 may be coupled to the system controller 202. In addition, in the illustrated embodiment, the gaming system 200 may also include a central display 210 that is coupled to the system controller 202 for displaying games played on one or more of the gaming machines 10.

In one embodiment, the system controller 202 may be implemented by one of the gaming controllers 16 associated with a gaming machine 10. In still another embodiment, the system controller 202 may be located remotely with respect to gaming machines 10, or within one of the gaming machine cabinet assemblies 18 (shown in FIG. 1).

In the illustrated embodiment, the system controller 202 determines if a bonus triggering event occurs in a game outcome being played at one or more of the gaming machines 10, and displays a bonus game such as, for example, the game 80 on the central display 210 if the bonus triggering event occurs. Alternatively, the system controller 202 may display the game 80 at one or more gaming machines 10 based on one or more bonus triggering events occurring in games played at the gaming machines 10. The bonus triggering event may be the appearance of a predefined symbol and/or a predefined symbol combination in a game outcome.

Figure 11:
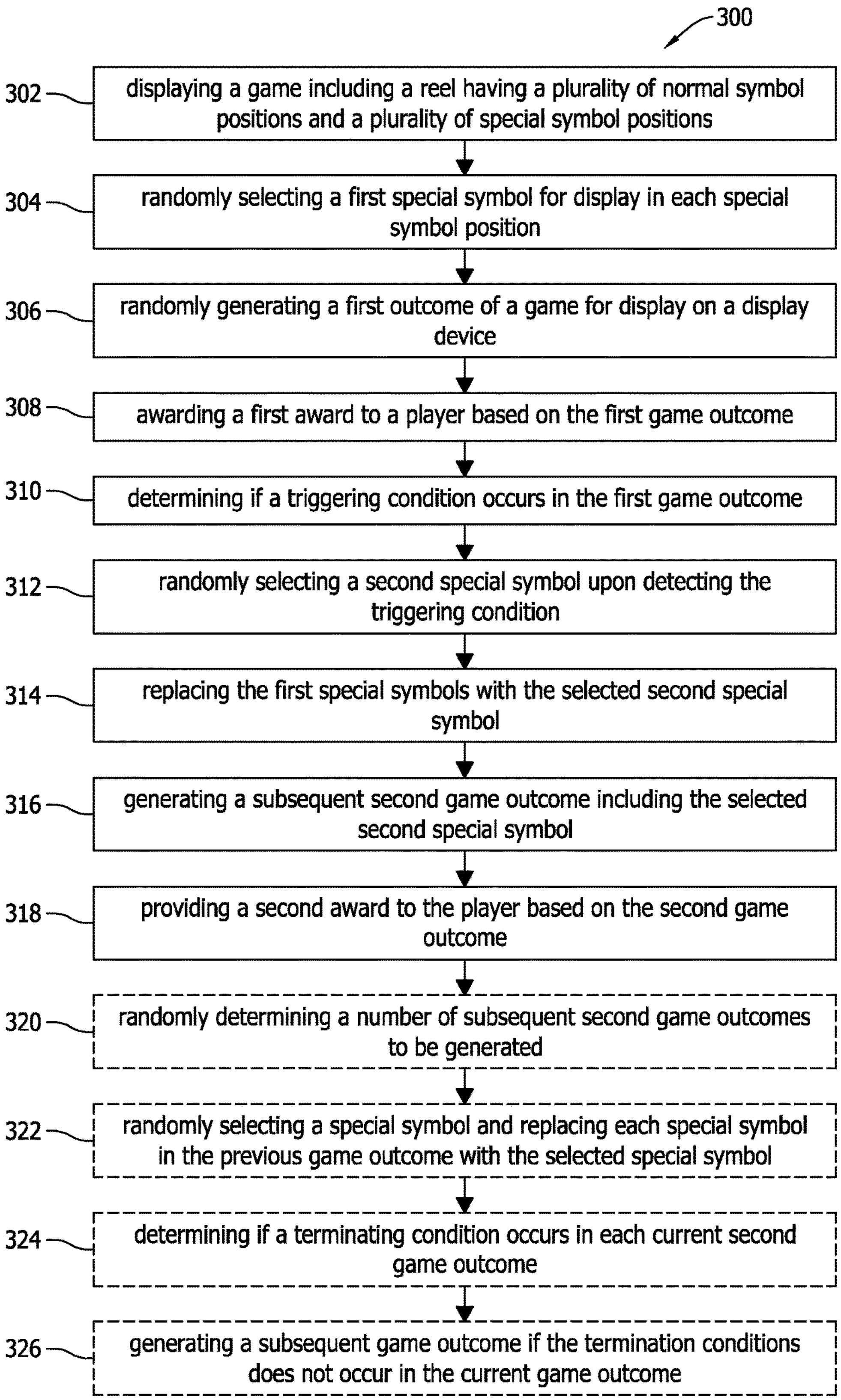
FIG. 11 is a flowchart of an exemplary method of allowing a player to play a gaming machine, according to an embodiment of the present invention.

FIG. 11 is a flowchart of an exemplary method 300 of allowing a player to play the gaming machine 10. In the illustrated embodiment, the method 300 includes displaying 302 the game 80 including at least one reel having a plurality of normal symbols positions and a plurality of special symbol positions. The method 300 also includes randomly selecting 304 a first special symbol 126 and displaying the selected first special symbol 126 in each special symbol position 118. A first game outcome 82 is randomly generated 306 and displayed in the display device 12, and an first award is awarded 308 to the player based on the first game outcome 82. The method 300 includes determining 310 if a triggering condition occurs in the first game outcome 82, responsively randomly selecting 312 a second special symbol 128 upon detecting the triggering condition, and replacing 314 the first special symbols 126 with the selected second special symbol 128 to generate 316 a subsequent second game outcome including the selected second special symbol. The method 300 also includes providing 318 a second award to the player based on the second game outcome 84.

In one embodiment, the method 300 may also include randomly determining 320 a number of subsequent second game outcomes to be generated and, for each second game outcome, randomly selecting 322 a special symbol and replacing each special symbol displayed in the previous game outcome with the selected special symbol.

In one embodiment, the method 300 may also include determining 324 if a terminating condition occurs in each current second game outcome 84, and generating 326 a subsequent game outcome if the termination condition does not occur in the current game outcome.

An exemplary technical effect of the methods, systems, and apparatus described herein includes at least one of (a) displaying, on a display device, a game including at least one reel, the at least one reel including a plurality of symbol positions and a plurality of symbols being displayed with the plurality of symbol positions, wherein the plurality of symbol positions including a plurality of normal symbols positions and a plurality of special symbol positions; (b) randomly generating a first outcome of a game and displaying the first game outcome on the display device; (c) spinning and stopping the at least one reel to display the generated first game outcome and responsively awarding a first award to the player based on the first game outcome; (d) determining if a triggering condition occurs in the first game outcome including a plurality of adjacent special symbol positions being displayed in the at least one reel; and (e) responsively randomly selecting a special symbol from a predefined set of special symbols and replacing the symbols being displayed in each adjacent special symbol position with the selected special symbol to generate a subsequent second game outcome including the selected special symbol.

The above-described system, apparatus, and methods overcome at least some disadvantages of known gaming machines by providing a gaming machine that randomly selects a first special symbol to be displayed in a plurality of symbol positions in a first game outcome, and randomly selects a second special symbol to replace each first special symbol in a second game outcome. In addition, the gaming machine provides a first award to the player based on the first game outcome and provides a second award to the player based on the second game outcome. By providing a gaming machine that randomly selects a first symbol to be displayed in each of a plurality of special symbol positions and randomly selects a second special symbol to replace the first special symbols in the second game outcome, the player's expectation for achieving a win is increased and the enjoyment of the game is improved. Thus, the amount of time that the game is played by patrons of a gaming establishment is thereby increased.

Exemplary embodiments of a gaming machine, a gaming system, and a method of allowing a player to play a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method of allowing a player to play a gaming machine including a controller, a display device, and an input device, the input device including an acceptor device which accepts physical media associated with a monetary value to establish a credit balance, the controller including a processor coupled to a memory device, the method comprising the controller performing the steps of:

receiving a signal from the acceptor device indicating a physical item associated with a monetary value being received from the player via the acceptor device and establishing a credit balance associated with the monetary value;

receiving a signal from the input device indicating a wager being placed by the player on a game and adjusting the credit balance as a function of an amount of the wager;

displaying, on the display device, a game including a plurality of reels being displayed in a display area, the display area include a plurality of cells, each reel having a plurality of symbols being displayed in a plurality of symbols positions, at least two of the reels having a run of consecutive special symbol positions, each consecutive special symbol position populated with a first special symbol;

randomly generating a first outcome and spinning and stopping the reels to display the generated first game outcome including a symbol being displayed in each of the plurality of cells in the display area;

detecting if a triggering condition occurs in the first game outcome, the triggering condition being defined as each of the runs of consecutive special symbol positions of the at least two of the reels appearing in the first outcome;

responsively generating and displaying a second outcome of the game including selecting a second special symbol, replacing each first special symbol in each of the runs of consecutive special symbol positions with the second special symbol;

and awarding an award to the player based on the second outcome and responsively adjusting the credit balance as a function of the award.

2. A method in accordance with claim 1, further comprising the steps of:

randomly selecting the first special symbol being displayed in each of consecutive special symbol positions in the first outcome; and, randomly selecting the second special symbol for replacing the first special symbol in the second game outcome.

3. A method in accordance with claim 1, further comprising the steps of:

randomly determining a number of second outcomes to be generated; and, for each second outcome, randomly selecting a special symbol and replacing the first special symbol in each of the consecutive special symbol positions in the previous game outcome with the selected special symbol.

4. A method in accordance with claim 3, further comprising the step of providing the second award to the player based on the determined number of second game outcomes being generated.

5. A method in accordance with claim 3, further comprising the steps of evaluating each second outcome and providing an award to the player after each generated outcome.

6. A method in accordance with claim 1, further comprising the step of detecting, for each second outcome, if a terminating condition occurs in the corresponding second outcome and responsively generating a subsequent game outcome if the termination condition does not occur, wherein generating each subsequent game outcome includes selecting a special symbol and replacing the symbols being displayed in each consecutive special symbol position in the previous game outcome with the selected special symbol.

7. A method in accordance with claim 6, wherein the terminating condition includes the appearance of a terminating symbol in the at least one reel.

8. A method in accordance with claim 1, wherein the triggering condition is further defined as a predefined number of consecutive special symbol positions appearing in the first outcome.

9. A method in accordance with claim 1, wherein the display area includes a plurality of cells associated with each of the reels, the triggering condition being further defined as consecutive special symbol position appearing in each of the reel cells of the at least one reel.

10. A method of allowing a player to play a gaming machine including a controller, a display device, and an input device, the input device including an acceptor device which accepts physical media associated with a monetary value to establish a credit balance, the controller including a processor coupled to a memory device, the method comprising the controller performing the step of:

receiving a signal from the acceptor device indicating a physical item associated with a monetary value being received from the player via the acceptor device and establishing a credit balance associated with the monetary value;

receiving a signal from the input device indicating a wager being placed by the player on a game and adjusting the credit balance as a function of an amount of the wager;

displaying, on the display device, a game including a plurality of reels being displayed in a display area, each reel having a plurality of symbols positions, at least one of the reels having a run of consecutive special symbol positions, each consecutive special symbol position populated with a first special symbol;

randomly generating a first outcome, displaying the generated first game outcome in the display area, and responsively awarding a first award to the player based on the first game outcome;

detecting if a triggering condition occurs in the first game outcome, the triggering condition being defined as at least a portion of the run of consecutive special symbol positions appearing on the at least one of the reels appearing in the first outcome; and randomly determining a number of second outcomes to be generated; and, for each second outcome, randomly selecting a special symbol and replacing the first special symbol in each of the consecutive special symbol positions in the previous game outcome with the selected special symbol; and providing a second award to the player based on the last generated outcome of the number of second game outcomes and responsively adjusting the credit balance as a function of the second award.

11. A method of allowing a player to play a gaming machine including a controller, a display device, and an input device, the input device including an acceptor device which accepts physical media associated with a monetary value to establish a credit balance, the controller including a processor coupled to a memory device, the method comprising the controller performing the steps of:

receiving a signal from the acceptor device indicating a physical item associated with a monetary value being received from the player via the acceptor device and establishing a credit balance associated with the monetary value;

receiving a signal from the input device indicating a wager being placed by the player on a game and adjusting the credit balance as a function of an amount of the wager;

displaying, on the display device, a game including a plurality of reels being displayed in a display area, each reel having a plurality of symbols positions, at least one of the reels having a run of consecutive special symbol positions, each consecutive special symbol position populated with a first special symbol;

randomly generating a first outcome, displaying the generated first outcome in the display area, and responsively awarding a first award to the player based on the first outcome;

detecting if a triggering condition occurs in the first game outcome, the triggering condition defined as at least a portion of the run of consecutive special symbol positions appearing on the at least one of the reels appearing in the first outcome including a predefined number of consecutive special symbol positions appearing in the first outcome, wherein the triggering condition is further defined as a run of consecutive special symbol positions appearing on two reels of the plurality of reels appearing in the first outcome; and responsively replacing the first special symbol in the run of consecutive special symbol positions with a second special symbol to generate a second outcome of the game, awarding a second award to the player based on the second outcome and responsively adjusting the credit balance as a function of the second award.

12. A method in accordance with claim 11, including the steps of receiving a signal, from the player via a betting button, indicative of a wager being placed on the game by the player and responsively generating the first outcome.

13. A method in accordance with claim 11, including the step of displaying the game on a video gaming machine installed in a casino.

14. A method machine in accordance with claim 11, including the steps of:

receiving a random number from a randomly number generator; and generating the first outcome as a function of the received random number.

15. A method in accordance with claim 11, including the steps of:

randomly selecting a plurality of symbols from the set of symbols being stored in a database to generate the first outcome; and spinning and stopping the reels to display the first outcome including the selected symbols.

16. A gaming machine, comprising:

a display device for displaying a game;

a user input device configured to generate a signal indicative of a player's selection input, the user input device including an acceptor device configured to accept physical media associated with a monetary value to establish a credit balance that may be used by the player to place a wager on the game; and a controller coupled to the display device and the user input device, the controller for receiving a signal from the user input device indicating a wager being made by the player, adjusting the credit balance by an amount of the wager, and displaying the game including a plurality of reels being displayed in a display area, the display area include a plurality of cells, each reel having a plurality of symbols being displayed in a plurality of symbols positions, at least two of the reels having a run of consecutive special symbol positions, each consecutive special symbol position populated with a first special symbol, the controller for randomly generating a first outcome and spinning and stopping the reels to display the generated first game outcome including a symbol being displayed in each of the plurality of cells in the display area, the controller for detecting if a triggering condition occurs in the first game outcome, the triggering condition being defined as each of the runs of consecutive special symbol positions of the at least two of the reels appearing in the first outcome, and for responsively generating and displaying a second outcome of the game including selecting a second special symbol, replacing each first special symbol in each of the runs of consecutive special symbol positions with the second special symbol, awarding an award to the player based on the second outcome, and responsively adjusting the credit balance as a function of the award.

17. A gaming machine in accordance with claim 16, the controller for randomly selecting the first special symbol being displayed in each of consecutive special symbol positions in the first outcome, and for randomly selecting the second special symbol for replacing the first special symbol in the second game outcome.

18. A gaming machine in accordance with claim 16, the controller for randomly determining a number of second outcomes to be generated and, for each second outcome, for randomly selecting a special symbol and replacing the first special symbol in each of the consecutive special symbol positions in the previous game outcome with the selected special symbol.

19. A gaming machine in accordance with claim 18, the controller for providing the second award to the player based on the determined number of second game outcomes being generated.

20. A gaming machine in accordance with claim 18, the controller for evaluating each second outcome and providing an award to the player after each generated outcome.

21. A gaming machine in accordance with claim 16, the controller for detecting, for each second outcome, if a terminating condition occurs in the corresponding second outcome and responsively generating a subsequent game outcome if the termination condition does not occur, wherein generating each subsequent game outcome includes selecting a special symbol and replacing the symbols being displayed in each consecutive special symbol position in the previous game outcome with the selected special symbol.

22. A gaming machine in accordance with claim 21, wherein the terminating condition includes the appearance of a terminating symbol in the at least one reel.

23. A gaming machine in accordance with claim 16, wherein the triggering condition is further defined as a predefined number of consecutive special symbol positions appearing in the first outcome.

24. A gaming machine in accordance with claim 16, wherein the display area includes a plurality of cells associated with each of the reels, the triggering condition being further defined as consecutive special symbol position appearing in each of the reel cells of the at least one reel.

25. A gaming machine, comprising:

a display device for displaying a game;

a user input device configured to generate a signal indicative of a player's selection input, the user input device including an acceptor device configured to accept physical media associated with a monetary value to establish a credit balance that may be used by the player to place a wager on the game; and a controller coupled to the display device and the user input device, the controller for receiving a signal from the user input device indicating a wager being made by the player, adjusting the credit balance by an amount of the wager, and displaying the game including a plurality of reels being displayed in a display area, each reel having a plurality of symbols positions, at least one of the reels having a run of consecutive special symbol positions, each consecutive special symbol position populated with a first special symbol, the controller for randomly generating a first outcome, displaying the generated first game outcome in the display area, and responsively awarding a first award to the player based on the first game outcome, the controller for detecting if a triggering condition occurs in the first game outcome, the triggering condition being defined as at least a portion of the run of consecutive special symbol positions appearing on the at least one of the reels appearing in the first outcome, the controller for randomly determining a number of second outcomes to be generated and, for each second outcome, for randomly selecting a special symbol and replacing the first special symbol in each of the consecutive special symbol positions in the previous game outcome with the selected special symbol, the controller for providing a second award to the player based on the last generated outcome of the number of second game outcomes and responsively adjusting the credit balance as a function of the second award.

26. A gaming machine, comprising:

a display device for displaying a game;

a user input device configured to generate a signal indicative of a player's selection input, the user input device including an acceptor device configured to accept physical media associated with a monetary value to establish a credit balance that may be used by the player to place a wager on the game; and a controller coupled to the display device and the user input device, the controller for receiving a signal from the user input device indicating a wager being made by the player, adjusting the credit balance by an amount of the wager, and displaying the game including a plurality of reels being displayed in a display area, each reel having a plurality of symbols positions, at least one of the reels having a run of consecutive special symbol positions, each consecutive special symbol position populated with a first special symbol, the controller for randomly generating a first outcome, displaying the generated first game outcome in the display area, and responsively awarding a first award to the player based on the first game outcome, the controller for detecting if a triggering condition occurs in the first game outcome, the triggering condition defined as at least a portion of the run of consecutive special symbol positions appearing on the at least one of the reels appearing in the first outcome including a predefined number of consecutive special symbol positions appearing in the first outcome, wherein the triggering condition is further defined a run of consecutive special symbol positions appearing on least two reels of the plurality of reels appearing in the first outcome, the controller for responsively replacing the first special symbol in the run of consecutive special symbol positions with a second special symbol to generate a second outcome of the game, awarding a second award to the player based on the second outcome, and responsively adjusting the credit balance as a function of the second award.

27. A gaming machine in accordance with claim 26, wherein the gaming machine is a video gaming machine installed in a gaming casino.

28. A gaming machine in accordance with claim 26, the user input device including a betting button to allow the user to place a wager on the game using the betting button.

29. A gaming machine in accordance with claim 26, the display device including a touchscreen to allow a player to place a wager and initiate the game via the touchscreen.

30. A gaming machine in accordance with claim 26, including a random number generator coupled to the controller, the random number generator configured to generate and transmit random numbers to the controller for use in generating the first and the second outcomes of the game.

31. A gaming machine in accordance with claim 26, including a database coupled to the controller, the database configured to store a set of symbols for use during the game, the controller for generating the first outcome including randomly selecting a plurality of symbols from the set of symbols and spinning and stopping the reels to display the selected symbols on the display device.

32. A system, comprising:

a plurality of gaming devices, each gaming device including a user input device for accepting a player's selection input, each user input device including an acceptor device configured to accept physical media associated with a monetary value to establish a credit balance that may be used by the player to place a wager on the game and a display device; and a system controller coupled to each gaming device of the plurality of gaming devices for receiving a signal from a user input device of at least one gaming device indicating a wager being made by the player, adjusting a corresponding credit balance by an amount of the wager, and displaying a game on the at least one gaming device, the game including a plurality of reels being displayed in a display area, the display area include a plurality of cells, each reel having a plurality of symbols being displayed in a plurality of symbols positions, at least two of the reels having a run of consecutive special symbol positions, each consecutive special symbol position populated with a first special symbol, the system controller for randomly generating a first outcome and spinning and stopping the reels to display the generated first game outcome in the display area, and responsively awarding a first award to the player based on the first game outcome, the system controller for detecting if a triggering condition occurs in the first game outcome, the triggering condition being defined as each of the runs of consecutive special symbol positions of the at least two of the reels appearing in the first outcome, and for responsively generating and displaying a second outcome of the game including selecting a second special symbol, replacing each first special symbol in each of the runs of consecutive special symbol positions with the second special symbol, awarding a second award to the player based on the second outcome, and responsively adjusting the corresponding credit balance as a function of the second award.

33. A system in accordance with claim 32, the system controller for randomly selecting the first special symbol being displayed in each of consecutive special symbol positions in the first outcome, and for randomly selecting the second special symbol for replacing the first special symbol in the second game outcome.

34. A system in accordance with claim 32, wherein the display area includes a plurality of cells associated with each of the reels, the triggering condition being further defined as consecutive special symbol position appearing in each of the reel cells of the at least one reel.

* * * * *